Sept. 16, 1969  R. B. COTTON  3,467,347
DEVICE FOR PAYING OUT, RETARDING AND RETRIEVING LINE
Filed April 20, 1967  5 Sheets-Sheet 1
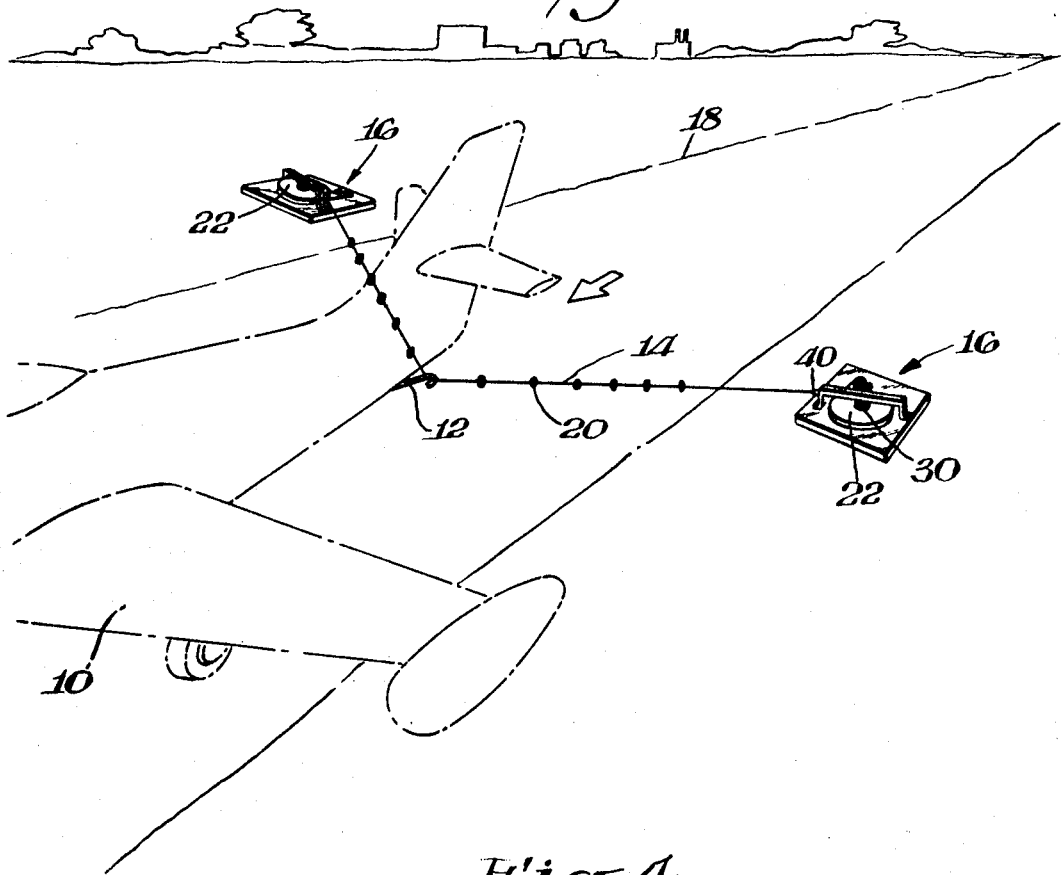
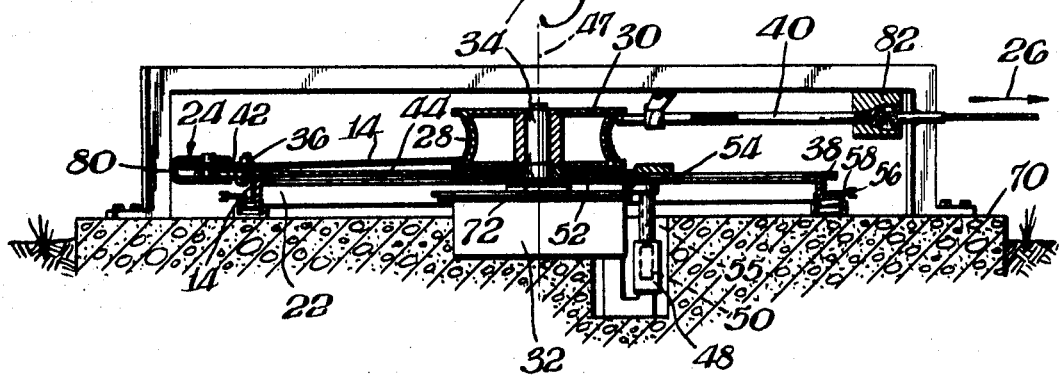

Sept. 16, 1969　　　　　R. B. COTTON　　　　　3,467,347
DEVICE FOR PAYING OUT, RETARDING AND RETRIEVING LINE
Filed April 20, 1967　　　　　　　　　　　　5 Sheets-Sheet 2
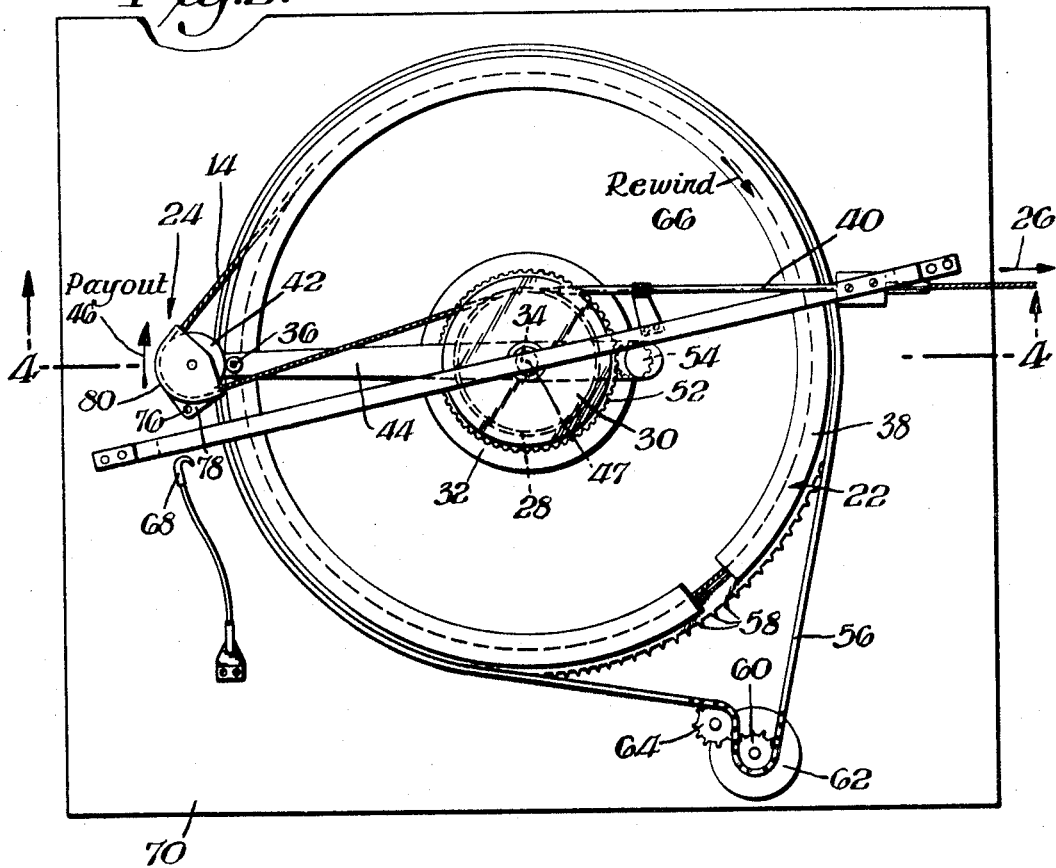

Sept. 16, 1969   R. B. COTTON   3,467,347
DEVICE FOR PAYING OUT, RETARDING AND RETRIEVING LINE
Filed April 20, 1967   5 Sheets-Sheet 3
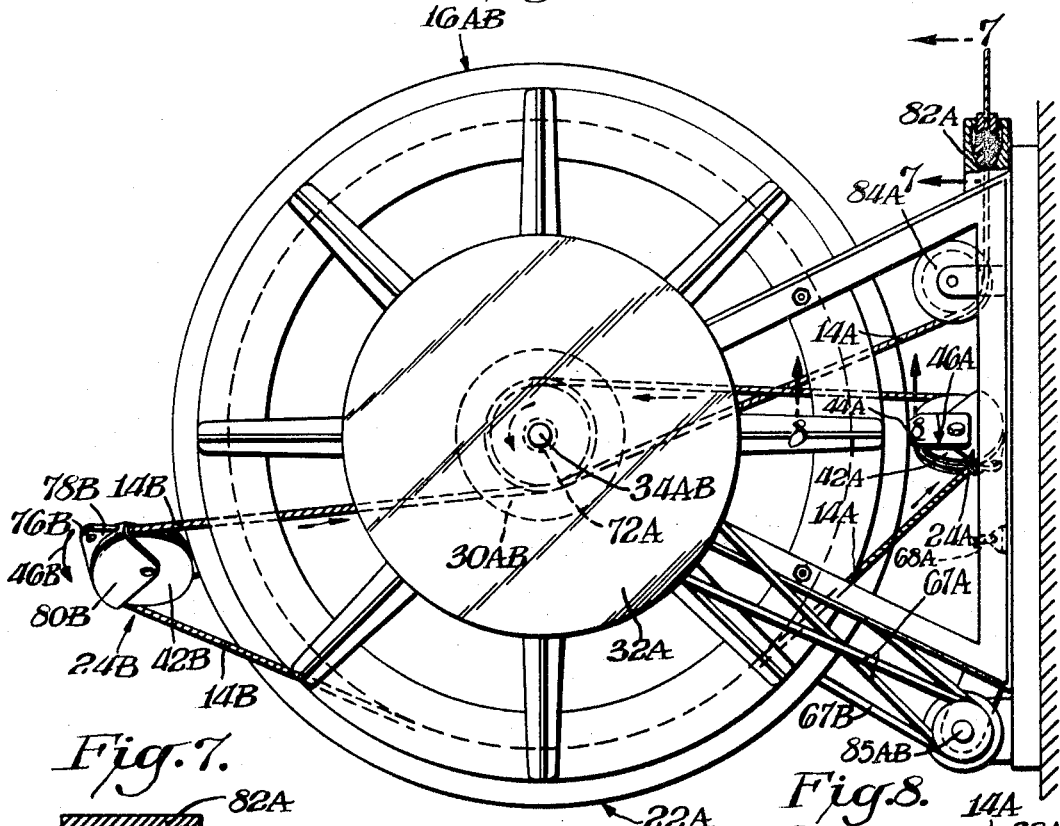
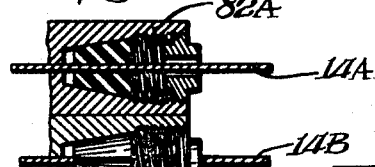
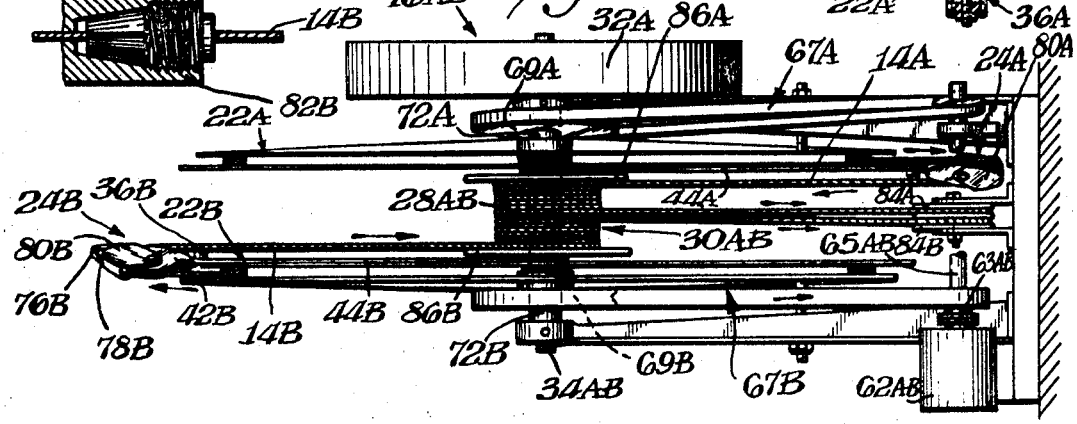

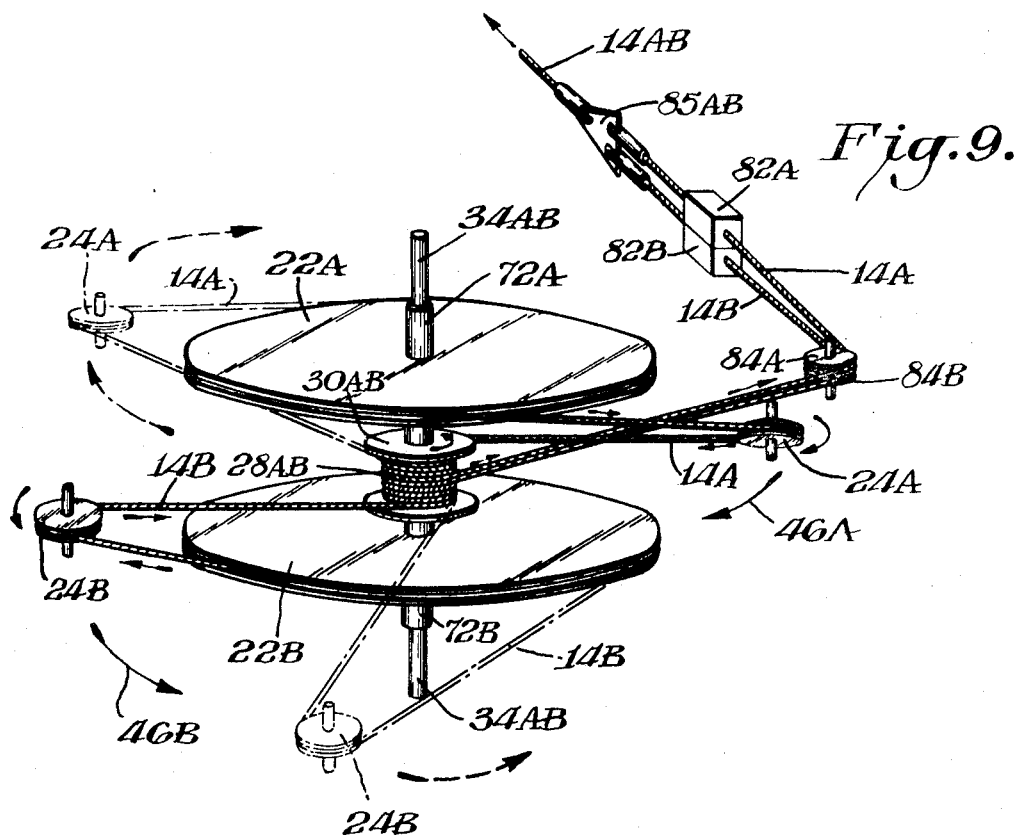

Sept. 16, 1969  R. B. COTTON  3,467,347
DEVICE FOR PAYING OUT, RETARDING AND RETRIEVING LINE
Filed April 20, 1967  5 Sheets-Sheet 5
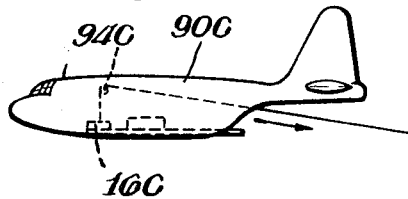
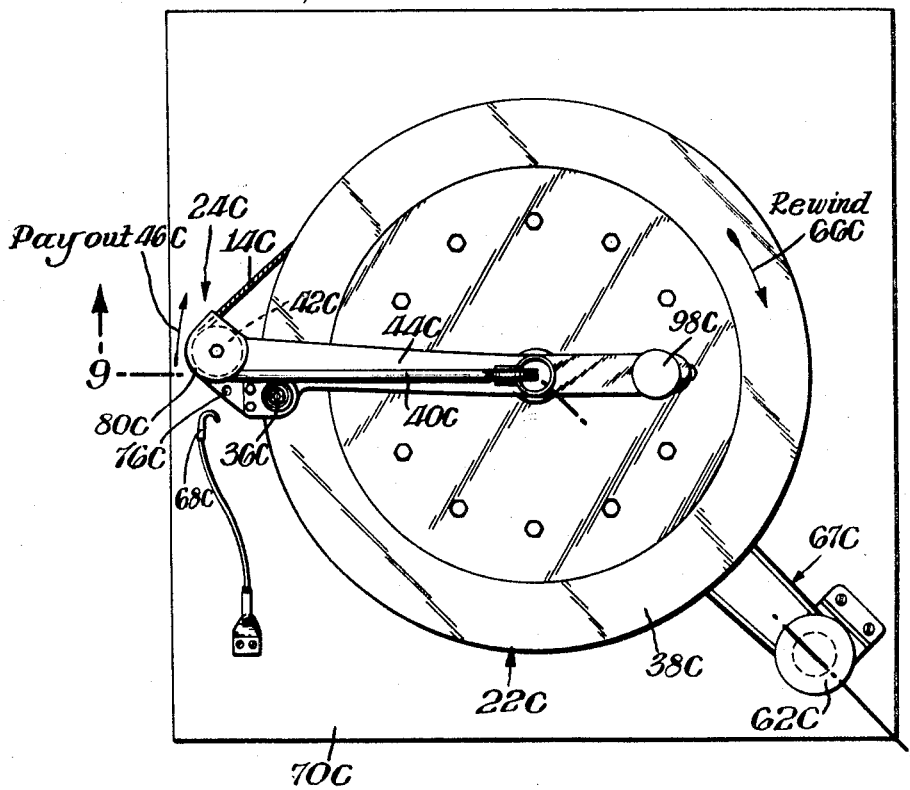
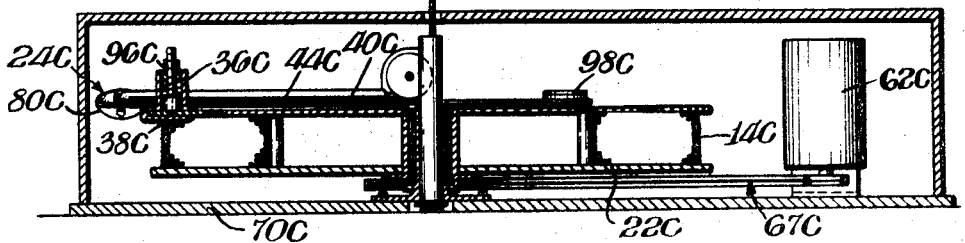

United States Patent Office 3,467,347
Patented Sept. 16, 1969

3,467,347
DEVICE FOR PAYING OUT, RETARDING
AND RETRIEVING LINE
Robert B. Cotton, Media, Pa., assignor to All American
Engineering Company, Wilmington, Del., a corporation of Delaware
Filed Apr. 20, 1967, Ser. No. 632,289
Int. Cl. B64c 25/68; B64f 1/02
U.S. Cl. 244—110                                30 Claims

ABSTRACT OF THE DISCLOSURE

Line such as rope or cable is stored upon a looped track from which it is unwound by a traveling guide in response to a pulling load. The force necessary to retard the load is applied between the guide and the load for minimizing the force applied to the guide. One embodiment utilizes a brake to retard movement of the guide. Another primarily uses an energy absorbing capstan between the guide and the load. The number of windings on the capstan is varied as loops are unwound from or wound upon the track to prevent twisting of the cable. The looped track may be a relatively large diameter reel concentrically mounted relative to the capstan. The traveling guide may be a sheave mounted upon a rotatable arm. Two pairs of cables, reels and guides acting on opposite ends of the capstan can maintain a constant number of windings positively confined upon it because one cable adds windings as the other removes them.

Background of the invention

This invention relates to a device for controlling the payout of a line under load. Such devices are useful for cable arrestment of landing aircraft or in controlling the payout of a loaded rope from an aircraft. They utilize extremely long lengths of cable having an appreciable mass. It is advantageous to avoid accelerating the entire mass of line as it starts paying out. Line has thus been wound upon a stationary drum from which it is unreeled during payout, as described in U.S. Patent 2,967,683. This however twists the line as it is unreeled, which tends to strain or unravel cable required for high load applications, such as arresting landing aircraft. Bending forces are also applied to the unwinding arm, thus complicating its structure and increasing its mass.

Summary

In accordance with this invention a line is stored by looping it around a curved track from which it is unwound in response to a pulling load by a traveling guide, such as a sheave. The necessary retarding force is applied between the traveling guide and the loaded end of the cable. This isolates the guide from the retarding forces, thus simplifying its construction and minimizing its weight and inertia. The track is readily provided by a relatively large diameter reel whose periphery may be skimmed by a simple line guide, such as the aforementioned sheave mounted upon a rotating arm. The retarding force may be simply provided by a friction brake reacting between the arm and reel flange, which avoids bending the arm.

An advantageous retarding device for high load applications, such as arresting landing aircraft, utilizes a capstan connected to an energy absorber. The traveling guide is constructed and arranged to vary the number of windings upon the capstan as it unwinds loops from the track and the reverse. This prevents cable from twisting, as it is payed out and retrieved and from being strained or unraveled. A single cable device minimizes the starting mass by adding windings to the capstan as the cable is payed out. A pair of cables, reels and guides acting on opposite ends of the capstan maintain a constant number of windings positively confined upon it and also minimize the required size of the cable and capstan. One cable adds windings to the capstan as the other removes them. A fluid energy absorber can advantageously be used to retard the capstan. Its action can be simple programmed by auxiliary use of the aforementioned type of friction brake, which can serve both to tension the cable in engagement with the capstan as it is payed out and to provide a supplemental retarding force at low speeds of the primary fluid energy absorber. The energy absorber may also be more elaborately programmed if important for special applications.

Brief description of the drawings

Novel features and advantages of the present invention will become apparent to one skilled in the art from a reading of the following description in conjunction with the accompanying drawing wherein similar reference characters refer to similar parts and in which:

FIG. 1 is a perspective view of one embodiment of this invention arresting a landing aircraft;

FIG. 2 is a top plan view of one unit of the embodiment shown in FIG. 1;

FIG. 3 is a front view in elevation of the unit shown in FIG. 2;

FIG. 4 is a cross-sectional view taken through FIG. 2 along the line 4—4;

FIG. 5 is a top plan view of a unit for another embodiment of this invention utilizing a pair of cables;

FIG. 6 is a front view in elevation of the embodiment shown in FIG. 5;

FIG. 7 is a cross-sectional view taken through FIG. 5 along the line 7—7;

FIG. 8 is a cross-sectional view taken through FIG. 5 along the line 8—8;

FIG. 9 is a perspective diagram of winding aspects of the embodiment shown in FIGS. 5–8;

FIG. 10 is a diagrammatic representation of a further embodiment of this invention paying out a loaded line from an airplane;

FIG. 11 is a top plan view of the further embodiment illustrated in FIG. 10; and FIG. 12 is a cross-sectional view taken through FIG. 11 along the line 12—12.

Description of preferred embodiments

FIG. 1 shows landing airplane 10 being arrested by engagement of its hook 12 with cable 14 connected to a pair of devices 16 mounted on opposite sides of runway 18. Cable 14 is supported above the surface of runway 18 for engagement with hook 12 by apertured discs 20 of U.S. Patent 3,010,683. Devices 16 pay out, retard and retrieve cable 14 in the manner described in the following in conjunction with FIGS. 1–4.

Cable 14 is, for example 1⅝" diameter steel cable stored upon relatively large diameter reel 22, which is stationary during payout of the cable. Reel 22 constitutes a looped track means about which substantially all of cable 14 is wound when arrestment is begun and payout of the cable initiated as shown in FIG. 3. This minimizes the inertia of the amount of cable which need be accelerated when arrestment is commenced.

FIG. 2 shows how cable 14 is unwound from reel 22 by traveling guide 24 which is rotated about the periphery of reel 22 in response to the outward movement of cable 14 in the direction of arrow 26 in response to the load imposed by arrested airplane 10. The energy imposed by airplane 10 is absorbed in the portion of cable 14 between airplane 10 and traveling guide 24. This is accomplished through cable windings 28 around capstan 30 connected to energy absorbed 32 by shaft 34.

In the initial condition shown in FIGS. 1 and 3, there are four windings 28 on capstan 30 thus minimizing the amount of cable which must be initially accelerated. Cable 14 is tensioned to maintain it in operative engagement with capstan 30 during payout by spot friction brake 36 in engagement with flange 38 of reel 22 which also acts as a brake drum. Brake 36 retards movement of unwinding guide 24 about reel 22, thus tensioning cable 14 being pulled toward capstan 30 is guided through exit tube 40 to its cross-runway alignment. Unwinding guide 24 includes pulley sheave 42 mounted on arm 44 which rotates about the axis 47 of capstan 30 and reel 22. Brake 36 is mounted in arm 44. Axis 47 is disposed within the right cylindrical envelope of reel or looped track 22, represented by the periphery of reel 22 shown in FIG. 2, to facilitate the winding and unwinding of turns 28 about capstan 30 by traveling guide 24.

During payout of cable 14 in the direction of arrow 26 as shown in FIG. 2, arm 44 rotates clockwise in the direction of arrow 46 to unwind loops of cable 14 from reel 22, which is maintained stationary as later described. Arm 44 also adds a winding 28 upon capstan 30 for each loop unwound from reel 22. This prevents cable 14 from twisting as a result of the removal of loops from reel 22 and avoids straining or unraveling of cable 14. Cable strength is thus preserved which is very important in high load applications such as in arresting a landing airplane. From the ready position shown in FIG. 3 in which four windings 28 of cable are wound upon the capstan, only a small amount of cable must be initially accelerated. Even using steel cable, this constitutes only a fraction of the mass of a reel of synthetic fiber tape all of which is accelerated during initial payout. This is particularly accentuated for longer runout lengths.

Energy absorber 32 is of any effective type such as fluid, friction or magnetic. For normal arresting functions using a fluid energy absorber, friction brake 36 supplies enough supplemental retarding force to that provided by fluid energy absorber 32, which is for example of the type described in U.S. Patent 3,172,625. Where however more elaborate programming is desired, this can be applied to fluid energy absorber 32 by the devices described in each of the following U.S. patents: 3,140,761, 3,168,-939, 3,172,626, or 3,259,213. Such programming also may be accomplished by programming device 48 in FIG. 4 including piston 50 operated from ring gear 52 and pinion gear 54. Gear 54 drives piston 50 through screw transmission 55 reducing the volume of air in the torus of the energy absorber during arrestment to work toward a substantially constant cable tension. Piston 50 accordingly forces fluid into the torus to increase the torque for a particular speed of rotation.

To retrieve cable 14 after payout requires relative motion between unwinding guide 24 and reel 22 in the direction opposite to payout. A simple mode of accomplishing this is to rotate reel 22 in the direction of arrow 66 by sprocket chain 56 shown in FIG. 2 engaged with teeth 58 about the periphery of reel 22. Sprocket chain 56 is driven by sprocket pinion 60 connected to retrieving electric motor 62 and maintained in tensioned engagement by idler sprocket 64. Retrieving motor 62 thus rotates reel 22 in the direction of arrow 66 to rewind cable 14 upon it. Arm 44 is held relatively stationary during rewind by engagement of anchor hook 68 secured to base pad 70. Hook 68 engages within hole 76 in extension 78 on sheave housing 80. Cable 14 is maintained tensioned during rewind about capstan 30 by one-way wedge-type friction brake 82 mounted upon tube 40, as shown in FIG. 4. Motor 62 includes a brake (not shown) for maintaining it and reel 22 stationary during payout.

FIGS. 5–9 show a dual cable form of such device 16AB having a pair of cables 14A and 14B stored upon reels 22A and 22B respectively disposed above and below capstan 30AB. Cables 14A and 14B are payed out together over exit sheaves 84A and B as shown in FIG. 9. They are connected to single cross runway pendant 14AB by connecting gusset 85AB. Device 16AB shown in FIGS. 5–9 uses the same parts shown in FIGS. 1–4 with the exception that some of them are duplicated. These duplicated parts are designated by single letter suffixes A and B. Parts which are singly utilized are designated by dual letter suffixes AB.

Cables 14A and 14B act upon opposite ends of capstan 30AB. Upper winding guide 24A thus adds windings to capstan 30AB during cable payout as lower winding guide 24B removes windings. This maintains the number of windings or turns 28 on capstan 30AB constant during payout and provides a constant overall turn thickness between flanges 86A and 86B on capstan 30AB. This positively confines turns 28AB between flanges 86A and 86B. The use of a pair of cables also minimizes the thickness of cables necessary to withstand a given load and also the size of the capstan. Two 1⅛″ diameter steel cables 14 can be thus utilized with a 24″ diameter capstan instead of one 1⅝″ cable with a 36″ diameter capstan. Arms 44A and B are secured to sleeves 72A and B which rotate freely upon capstan shaft 34AB.

The retrieval of cables 14A and 14B upon stationary reels 22A and 22B is accomplished by rotating winding guides 24A and 24B in directions reverse or counter to payout. Payout direction of rotation is indicated by arrows 46A and 46B. Retrieving rotation of arms 44A and 44B is driven by retrieving electric motor 62AB through clutch 63AB, shaft 65AB and pulley and belt assemblies 67A and 67B, which are also secured to sleeves 72A and B. Belt transmission 67B is looped in a figure eight form to provide counter rotation between arms 44A and 44B during rewind. Clutch 63AB disconnects retrieving motor 62AB from pulley and belt assemblies 67A and 67B to permit them to free wheel during payout. Cables 14A and 14B are thus wound and stored upon reels 22A and 22B as shown in FIG. 9 in opposite directions thereby causing the illustrated counter directions of rotation of arms 44A and B and guides 24A and B while cables 14A and B are unwound during payout. This maintains a constant number of windings 28AB on capstan 30AB as previously described. The operation of the dual cable device shown in FIGS. 5–9 is similar to that shown in FIGS. 1–4 in all respects other than described above.

FIGS. 10–12 show a form of this invention for paying out and retarding a line 88C such as nylon rope from an airplane 90C in response to a pull of a load 92C, such as a parachuted buoy. Rope 88C is payed out over an exit sheave 94C from device 16C mounted upon the deck of airplane 90C.

Device 16C is similar to device 16 shown in FIGS. 1–4 except that it does not include capstan 30. Line 88C thus twists as it is payed out, but this is not of consequence in the illustrated application in which the loaded end of the line is free to turn. Spot brake 36C reacting upon flange 38C of reel 22C provides all of the necessary retarding force. Brake 36C is adjustable by means of nut 96C. Brake 36C is of preset type but it could be programmed, if desired, for example, from a linkage through the reel shaft.

The force exerted by brake 36C to retard the rotation of arm 44C and unwinding sheave 42C (together constituting traveling guide 24C) is interposed between guide 24C and load 92C. This minimizes the bending forces applied to arm 44C and makes the forces applied substantially compressive. This simplifies and minimizes the weight of arm 44C, which constitutes the essential mass of the moving assembly in conjunction with balance weight 98C. The retarding arrangement is also remarkably simple by its utilization of existing reel flange 38C as a brake drum. Retrieving is accomplished in the manner previously described in conjunction with FIGS. 1–4.

This device makes it possible to pay out, pickup and recover a wide variety of loads ranging from 250 to 2500 lbs. without exceeding 4 $g$'s. During payout, the mass initially accelerated need only be burdened by a short length of line (approximately 50 ft.) and the mass of the line guide assembly. This makes it possible to recover a 250 lb. object by a line of rope or cable (without exceeding a 4 $g$ peak accelerating load (which is also of sufficient strength to recover a 2500 lb. object. A one-inch diameter nylon rope weighing 14 lb. per 50 ft. and having breaking strength of approximately 25,000 lbs. can be accordingly used over the full range of the above loads.

The illustrated device is advantageous for paying out as much as 5000 ft. of ¼″ diameter nylon rope or more, and it is also adaptable for a wide variety of rope or cable sizes or materials. It is also highly useful for air pickup for a wide variety of objects of varying weight. After pickup, the device retards the resultant payout while the object is accelerated to flying speed. Thereafter the object is recovered into the airplane by retrieving the cable in the manner previously described.

I claim:

1. A device for paying out retarding and retrieving line comprising a line, one end of said line being adapted to engage a load for retarding its movement, looped track means, said line being wound about said looped track means for storing it, traveling guide means engaging said line adjacent said track means for unwinding said cable from said track means and the reverse, and energy absorbing means connected in retarding engagement to a portion of said line which is disposed between said guide means and said load for minimizing the force applied to said guide means.

2. A device as set forth in claim 1 wherein said looped track means comprises reel means and said traveling guide means comprises line guide means having a circular path of travel disposed concentrically outside of said reel means.

3. A device as set forth in claim 2 wherein said reel means comprises a flanged reel, said guide means comprising a sheave, and said sheave being mounted upon rotational support means.

4. A device as set frth in claim 3 wherein said rotational support means comprises an arm, and bearing means disposed concentrically with said reel means for rotating said arm and sheave peripherally about said reel means.

5. A device as set forth in claim 2 wherein said energy absorbing means comprises brake means reacting to retard movement of said guide means about said track means.

6. A device as set forth in claim 4 wherein said reel means includes a flange, and said energy absorbing device comprising brake means reacting between said arm and said flange whereby said result forces exert substantially compressive forces upon said arm.

7. A device as set forth in claim 1 including retrieving means comprising drive means and linking means for connecting said drive means to provide relative movement between said guide means and said track means in a direction to wind said line upon said track means.

8. A device as set forth in claim 2 including cable retrieving means comprising main bearing means, said reel means being mounted upon said main bearing means to afford rotation thereof, retrieving drive means and linking means connecting said retrieving means to rotate said reel means, and anchoring means attachable to said guide means for holding said guide means stationary relative to said reel means while it is being rotated to rewind said cable upon it.

9. A device as set forth in claim 5 wherein said brake means comprises a friction brake means.

10. A device as set forth in claim 1 wherein said line comprises a cable, said energy absorbing means comprises capstan means, an energy absorbing engine, transmission means connecting said capstan means with said eergy absorbing engine, said engaged portion of said cable being wound about said capstan means with lengths extending to said load and to said track means, auxiliary retarding means tensioning each of said lengths of said cable when they are being pulled toward said capstan means for maintaining said cable in operative engagement therewith, and said guide means being constructed and arranged to vary the number of windings upon said capstan means in accordance with the number of loops unwound from said track means whereby twisting of said cable is prevented.

11. A device as set forth in claim 10 wherein said looped track means comprises circular track means having a right cylindrical envelope, and the axis of said capstan means being disposed within said envelope for facilitating said winding and unwinding of said cable upon said capstan means from and to said track means.

12. A device as set forth in claim 11 wherein said capstan and track means are concentrically mounted.

13. A device as set forth in claim 12 wherein said guide means comprises a sheave and rotational support means for moving said sheave peripherally about said track means.

14. A device as set forth in claim 13 wherein exit guide means is engaged with said length of said cable extending to said load for guiding and stabilizing said length.

15. A device as set forth in claim 14 wherein reverse-acting tensioning means is engaged with said length of cable extending to said load for maintaining said cable in engagement with said capstan when said cable is being rewound upon said track means.

16. A device as set forth in claim 15 wherein said reverse-acting tensioning means comprises a one-way acting friction brake.

17. A device as set forth in claim 10 wherein said looped track means comprises reel means and said traveling guide means comprises cable guide means having a circular path of travel disposed concentrically outside of said reel means.

18. A device as set forth in claim 17 wherein said reel means comprises a flanged reel, said guide means comprising a sheave and said sheave being mounted upon rotational support means.

19. A device as set forth in claim 18 wherein said rotational support means comprises an arm, and bearing means disposed concentrically with said reel means for rotating said arm and sheave peripherally about said reel means.

20. A device as set forth in claim 10 wherein said energy absorbing means also includes auxiliary brake means reacting to retard movement of said guide means about said track means.

21. A device as set forth in claim 20 wherein said energy absorbing engine comprises a fluid energy absorbing engine and said auxiliary brake means supplementing said fluid energy absorbing engine to program said device.

22. A device as set forth in claim 10 including retrieving means comprising drive means and linking means for connecting said drive means to provide relative movement between said guide means and said track means in a direction to wind said cable upon said track means.

23. A device as set forth in claim 11 including cable retrieving means comprising main bearing means, said reel means being mounted upon said main bearing means to afford rotation thereof, retrieving drive means and linking means connecting said retrieving means to rotate said reel means, and anchoring means attachable to said guide means for holding said guide means stationary relative to said reel means while it is being rotated to rewind said cable upon it.

24. A device as set forth in claim 23 wherein said energy absorbing means also includes auxiliary brake means reacting to retard movement of said guide means about said track means.

25. An energy absorbing device as set forth in claim 10 comprising pairs of said cables, said looped track means, said movable guide means and auxiliary retarding means, one of said cables entering said capstan means from said track means at the top of said capstan and the other of said cables entering said capstan means from the bottom, said lengths of said cables extending to said load being disposed adjacent each other upon said capstan, and said cables being wound about said looped track means in opposite directions relative to each other whereby movement of said guide means in winding and unwinding cable from said track means and said capstan means maintains a constant number of said windings upon said capstan.

26. A device as set forth in claim 25 wherein said capstan comprises a pair of end flanges between which said constant number of windings are confined.

27. A device as set forth in claim 26 wherein one of said track means are disposed concentrically with respect to opposite ends of said capstan means.

28. A device as set forth in claim 25 in combination with cable retrieving means, said cable retrieving means comprising drive means, linking means connecting said drive means to provide relative movement between said guide means and said track means in directions to rewind said cables upon said track means.

29. A device as set forth in claim 28 wherein said linking means connects said drive means with said guide means for moving said guide means in directions opposite to their directions during cable payout.

30. A device as set forth in claim 29 wherein said linking means comprises reverse driving means whereby said guide means are moved in counter-rotating directions for winding said cables upon said looped track means in directions opposite to each other.

References Cited

UNITED STATES PATENTS 2,967,683   1/1961   Crater _____ 244—110

MILTON BUCHLER, Primary Examiner

PAUL E. SAUBERER, Assistant Examiner

U.S. Cl. X.R.

244—137